United States Patent Office 2,946,205
Patented July 26, 1960

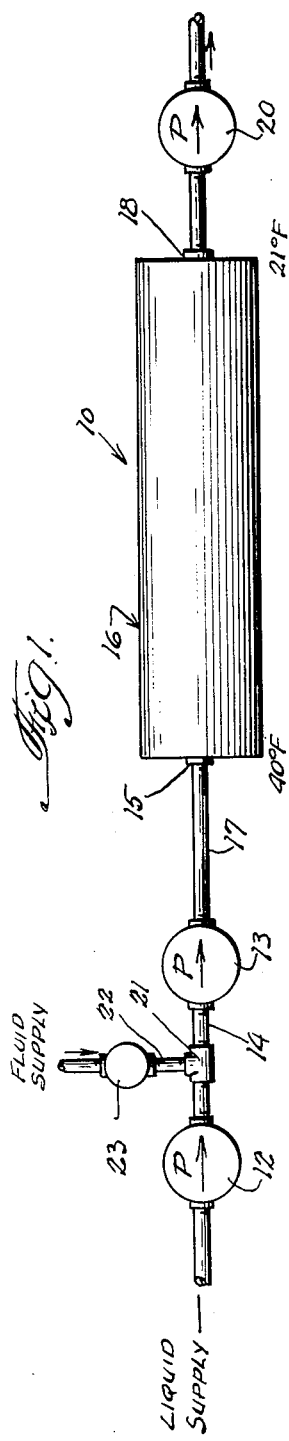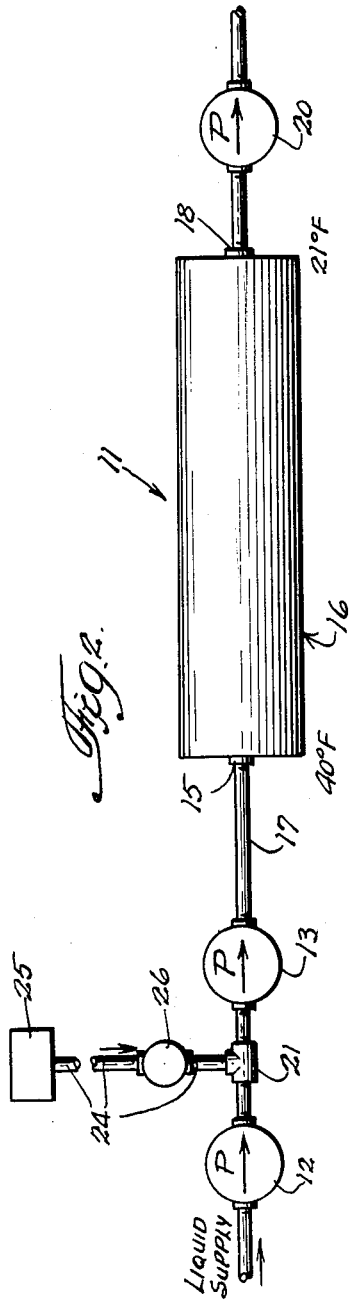

2,946,205

AERATING AND REFRIGERATING APPARATUS

Alden H. Wakeman, Lake Mills, Wis., assignor to The Creamery Package Mfg. Company, Chicago, Ill., a corporation of Illinois Filed Jan. 23, 1958, Ser. No. 710,793

5 Claims. (Cl. 62—304)

This invention relates to an aerating and refrigerating apparatus of a type such as might be used in commercial dairies, for the continuous manufacture of ice cream or the like.

Various apparatus have hertofore been proposed which, however, have not effectively provided overrun control in the product being manufactured. By the term "overrun" is meant the amount (percentage-wise) of air or gaseous material incorporated in the product. Because of the pronounced effect overrun has on the palatable character, quality, and cost of numerous products, such as ice cream, for example, accurate control thereof is of utmost importance in economically maintaining a high and uniform quality for the product. Heretofore, some overrun control has been attained by various prior art apparatus; however, such control has been accomplished only by way of sacrificing simplicity of construction of such apparatus which, in many instances, not only materially increases the initial cost of such apparatus but, also, the size thereof, as well as complicates the maintenance of such apparatus. Furthermore, such prior apparatus have not proven successful in controlling the overrun to the accurcay desired where the pressures in the system downstream of the apparatus fluctuates or is higher than the pressure to be maintained in the refrigerated chamber.

Thus, it is one of the objects of this invention to provide an aerating and refrigerating apparatus which is possessed of high capacity and yet is capable of maintaining accurate overrun control during the continuous manufacture of such product.

It is a further object of this invention to provide an aerating and refrigerating apparatus which is of simple construction, readily maintainable in proper working order and capable of automatically maintaining accurate overrun control.

It is a still further object of this invention to provide an aerating and refrigerating apparatus which is capable of accommodating products of widely varying density and character.

It is a still further object of this invention to provide an aerating and refrigerating apparatus wherein the product flow through the apparatus is maintained at a substantially uniform rate and thereby accomplish uniform texture and overrun control.

It is still further object of this invention to provide an aerating and refrigerating apparatus wherein accurate overrun control of the product is maintained while the product is passing through the apparatus, notwithstanding the processed product being subsequently subjected in the system to higher pressures or pressure variations downstream of the apparatus.

It is a further object of this invention to provide an aerating and refrigerating apparatus and, more preferably, a means in the apparatus wherein a predetermined pressure is maintained in the processing chamber regardless of variations in the rate of flow of fluid and product introduced in the said chamber.

Further and additional objects will appear from the description, accompanying drawing, and appended claims.

In accordance with one embodiment of this invention, an apparatus is provided for use in aerating and refrigerating a readily solidifiable liquid. The apparatus includes an elongated refrigerated chamber through which the liquid is circulated and simultaneously agitated. A first pump is also provided for imparting a substantially uniform rate of liquid flow. Serially connected to the first pump and downstream with respect thereto, is a second pump, the discharge side of which is directly connected to the inlet end of the refrigerated chamber. Communicating with the liquid flowing from the first pump to the second pump is means for effecting admission of a gaseous fluid into such flowing liquid. Connected to the outlet end of the chamber is a third pump which effects uniform rate of flow of the liquid and fluid admixture from said chamber.

For a more complete understanding of this invention, reference should be made to the drawing, wherein:

Figure 1 is a fragmentary diagrammatic view of one form of the improved apparatus.

Fig. 2 is similar to Fig. 1, but showing a second form of the improved apparatus.

Referring now to the drawing, two forms, 10 and 11, of the improved apparatus are shown. The two forms of the apparatus are substantially the same except for one variation, to be described more fully hereinafter.

Both forms of the improved apparatus are suitable for use in the commercial production of ice cream or a like product. Each form of the improved apparatus comprises a first pump 12 which is of a positive type and is adapted to communicate with a suitable liquid supply. The liquid, when the improved apparatus is being utilized for the making of ice cream, constitutes ice cream mix.

Serially connected to the discharge side of pump 12 is a second pump 13, which is also of a positive type. A conduit section 14 is provided to effect the interconnection between pumps 12 and 13. The discharge, or outlet, side of second pump 13 is connected to the inlet end 15 of an elongated refrigerated cylindrically-shaped chamber 16 by a conduit section 17. Section 17, however, may be eliminated, if desired. Chamber 16 has disposed therein a rotating dasher or agitating member which may be of a type similar to that disclosed in United States Patent No. 2,210,366. The dasher is adapted to effect whipping or aeration of the mix as it is circulated longitudinally through chamber 16. The outlet end 18 of chamber 16 is connected to the intake side of a third pump 20, which is of a positive type and effects uniform discharge of the aerated mix from the chamber and directs the same to a packaging machine or the like.

Interposed, in this instance, in conduit section 14 is a T connection 21 which communicates with a fluid supply through a conduit 22. The fluid supply, in the case where the product being produced is ice cream, is air or gaseous material. In the form 10 of the improved apparatus shown in Fig. 1, there is disposed within conduit 22 and ahead of T connection 21, a regulating element 23 which is adapted to control the fluid flowing in conduit 22. By maintaining the capacity of pump 13 greater than that of pump 12, there is an assurance that a predetermined amount of fluid will be admitted into the liquid flowing in conduit section 14. By "capacity" is meant that either the size of pump 13 with respect to pump 12 is greater, or that pumps 12 and 13 are of substantially the same size, but the impeller of pump 13 is driven at a greater speed. A further factor of importance in the higher capacity of pump 13 relative to pump 12 is that fluid can be introduced into the liquid stream at pressures which may be subatmospheric. It is important that the capacity of pump 20 be less than the capacity of pump 13, so that a positive pressure will be continually maintained within refrigerated chamber 16. By maintaining this positive pressure in chamber 16, more effective aeration of the mix while passing through chamber 16 results.

Under normal operating conditions, it is preferred that pumps 12, 13, and 20 be relatively sized as follows: Pump 12—4 volumes; pump 13—12 volumes; and pump 20—5 volumes. Where these pump sizes are utilized, the following operating conditions occur when it is desired to obtain approximately 100% overrun; (a) the liquid (ice cream mix) is pumped from the liquid supply at a temperature of approximately 40° F.; (b) the liquid and fluid combination has substantially the same temperature (40° F.) upon reaching the inlet 15 to chamber 16; and (c) during travel and aeration of the liquid and fluid combination through chamber 16, the liquid and fluid combination is subjected to a pressure of approximately 40-50 p.s.i., and the temperature thereof is reduced from approximately 40° F. to approximately 21° F., at which temperature it is discharged. It has been found that the mix, while within this temperature range, is in a condition for effecting optimum air incorporation. The discharged liquid and fluid admixture, after leaving chamber 16, enters pump 20 and is motivated thereby downstream to packaging equipment or the like.

In the form 11 of the improved apparatus, shown in Fig. 2, the fluid supply conduit section 22, with the regulating element 23 incorporated therein, as described for apparatus 10, is substituted by a conduit section 24 which communicates with a source of fluid pressure 25. The pressure of the fluid flowing through conduit section 24 into conduit section 14 of apparatus form 11 is greater than the pressure of the liquid flowing from pump 12 to pump 13. In order to insure that the correct amount of air under positive pressure is admitted into the liquid flow, a metering or regulating valve 26 is interposed in conduit section 24 between the source of fluid pressure 25 and T connection 21.

In either form of apparatus 10 or 11, the pumps thereof may be driven by a common source of power through suitable mechanism, so that the relative speeds of the various pumps can be accurately determined and maintained. In the form 10 of the improved apparatus, the amount of air admitted in the liquid flow will be dependent upon the capacity differential between pump 12 and pump 13. With such an arrangement, if the liquid (mix) has considerable fluid (air) entrained therein, prior to reaching pump 12, only so much additional fluid (air) will be introduced into the liquid flow to satisfy the capacity differential between pumps 12 and 13 and thus attain the desired overrun for the product.

In the form 11 of the improved apparatus shown in Fig. 2, the setting of regulating valve 26 is accurately made, to compensate for the pressure maintained by the source of fluid pressure 25 and the capacity differential between pumps 12 and 13.

Thus, it will be readily seen that an improved aerating and refrigerating apparatus has been provided which automatically and accurately controls the amount of fluid admitted into the liquid and accurately maintains a given pressure within the refrigerated chamber, so as to attain the desired overrun for the latter. Furthermore, the improved apparatus is simple in construction, may be readily maintained, has a large capacity, and is capable of being utilized with products having widely varied characteristics.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:
1. An apparatus for aerating and refrigerating a readily solidifiable liquid wherein the line pressure downstream of said apparatus is subject to fluctuation, comprising an elongated refrigerated chamber through which such a liquid is circulated longitudinally thereof and simultaneously agitated, a first pump for imparting a substantially uniform rate of flow to a liquid, a second pump serially connected to the discharge side of said first pump by a conduit section, the capacity of said second pump being greater than that of said first pump, the discharge side of said second pump being connected to the inlet end of said chamber, means connected to said conduit section for effecting admission of a predetermined amount of a gaseous fluid into the liquid flowing from said first to said second pumps, and a third positive type pump having the suction side thereof connected to the outlet end of said chamber for maintaining a substantially uniform rate of flow of the admixture of such liquid and fluid from said chamber; the capacity of said third pump being less than the capacity of said second pump and the ratio of capacities of said second and third pumps being constant whereby a positive uniform pressure is continuously maintained within said chamber.

2. An apparatus for aerating and refrigerating a readily solidifiable liquid wherein the line pressure downstream of said apparatus is subject to fluctuation, comprising an elongated refrigerated chamber through which such a liquid is circulated longitudinally thereof and simultaneously agitated, a first positive type pump for imparting a substantially uniform rate of flow to such liquid, a second positive type pump serially connected to the discharge side of said first pump, the discharge side of said second pump being directly connected to the inlet side of said chamber, said second pump having a greater capacity than said first pump and maintaining a substantially uniform rate of liquid flow into said chamber, conduit means interconnecting the discharge side of said first pump with the intake side of said second pump, means connected to said conduit means for effecting admission of a gaseous fluid into the liquid flowing from said first to said second pumps, and a third positive type pump having the intake side thereof connected to the outlet side of said chamber, the ratio of capacities of said second and third pumps being constant whereby a uniform positive pressure is continuously maintained in said chamber.

3. The apparatus recited in claim 2, wherein the capacity of said second pump is greater than the capacities of said first and third pumps, and the capacity of said third pump is greater than that of said first pump.

4. The apparatus recited in claim 3, wherein the means connected to said conduit means includes regulating valve means for maintaining the pressure of the admitted gaseous fluid below that of the liquid flowing from said first to said second pumps.

5. The apparatus recited in claim 3, wherein the means connected to said conduit means includes a source of gaseous fluid under pressure and regulating means in communication therewith and disposed between said conduit means and said source of gaseous fluid for maintaining the pressure of the admitted gaseous fluid above that of the liquid flowing from said to said second pumps.

References Cited in the file of this patent
UNITED STATES PATENTS

| | | |
|---|---|---|
| 2,067,683 | Routh | Jan. 12, 1937 |
| 2,211,387 | Routh | Aug. 13, 1940 |
| 2,219,656 | Miller | Oct. 29, 1940 |
| 2,426,368 | Mayne | Aug. 26, 1947 |

UNITED STATES PATENT OFFICE
CERTIFICATE OF CORRECTION

Patent No. 2,946,205            July 26, 1960

Alden H. Wakeman

It is hereby certified that error appears in the printed specification of the above numbered patent requiring correction and that the said Letters Patent should read as corrected below.

Column 1, line 37, for "accurcay" read -- accuracy --; line 59, after "is" insert -- a --; column 4, line 62, before "to" insert -- first --.

Signed and sealed this 3rd day of January 1961.

(SEAL)

Attest:

KARL H. AXLINE
Attesting Officer

ROBERT C. WATSON
Commissioner of Patents